US011386435B2

(12) United States Patent
Yan et al.

(10) Patent No.: US 11,386,435 B2
(45) Date of Patent: Jul. 12, 2022

(54) SYSTEM AND METHOD FOR GLOBAL THIRD PARTY INTERMEDIARY IDENTIFICATION SYSTEM WITH ANTI-BRIBERY AND ANTI-CORRUPTION RISK ASSESSMENT

(71) Applicant: THE DUN & BRADSTREET CORPORATION, Short Hills, NJ (US)

(72) Inventors: Jingtao Jonathan Yan, Princeton, NJ (US); Nipa Basu, Warren, NJ (US); Alla Kramskaia, Edison, NJ (US)

(73) Assignee: THE DUN AND BRADSTREET CORPORATION, Short Hills, NJ (US)

( * ) Notice: Subject to any disclaimer, the term of this patent is extended or adjusted under 35 U.S.C. 154(b) by 920 days.

(21) Appl. No.: 15/874,531

(22) Filed: Jan. 18, 2018

(65) Prior Publication Data

US 2018/0285886 A1    Oct. 4, 2018

Related U.S. Application Data

(60) Provisional application No. 62/480,869, filed on Apr. 3, 2017.

(51) Int. Cl.
*G06Q 30/00* (2012.01)
*G06Q 10/06* (2012.01)
(Continued)

(52) U.S. Cl.
CPC .......... *G06Q 30/018* (2013.01); *G06F 16/27* (2019.01); *G06N 20/00* (2019.01); *G06Q 10/0635* (2013.01)

(58) Field of Classification Search
CPC .. G06Q 30/018; G06Q 10/0635; G06Q 10/06; G06Q 40/08; G06N 20/00; G06F 16/27
See application file for complete search history.

(56) References Cited

U.S. PATENT DOCUMENTS 7,822,757 B2    10/2010  Stoker et al.
8,046,298 B1 *  10/2011  Voth ....................... G06Q 40/00
                                                         705/35
(Continued)

FOREIGN PATENT DOCUMENTS

WO         01/31483 A2    5/2001

OTHER PUBLICATIONS

Corradini et al., "Business Rules in e-Government Applications", Electronic Journal of e-Government, 2009, vol. 7, Issue 1, pp. 45-54, www.ejeg.com.

*Primary Examiner* — Rutao Wu
*Assistant Examiner* — Stephen S Swartz
(74) *Attorney, Agent, or Firm* — Ohlandt, Greeley, Ruggiero and Perle, LLP

(57) ABSTRACT

An identification and assessment system that flags business entities that are current or future Third Party Intermediaries and provides compliance risk ratings In at least one embodiment, the system is configured for TPI identification to enable companies to optimize compliance efforts, for example, effective anti-bribery and anti-corruption compliance. The system is configured to identify TPI likelihood and General Compliance Risk Rating to enable businesses to setup anti-bribery and anti-corruption (ABAC) strategies to focus on those high-risk TPIs, perform due diligence, and mitigate compliance risk.

17 Claims, 7 Drawing Sheets

(51) Int. Cl.
  *G06N 20/00*    (2019.01)
  *G06F 16/27*    (2019.01)

(56) References Cited

U.S. PATENT DOCUMENTS

| | | | |
|---|---|---|---|
| 8,346,790 | B2 | 1/2013 | Stoker et al. |
| 9,760,871 | B1* | 9/2017 | Pourfallah .............. G06Q 10/10 |
| 10,282,426 | B1* | 5/2019 | Lerner .................. G06F 16/273 |
| 2002/0120474 | A1 | 8/2002 | Hele et al. |
| 2002/0152156 | A1* | 10/2002 | Tyson-Quah .......... G06Q 40/12 |
| | | | 705/38 |
| 2008/0033775 | A1* | 2/2008 | Dawson ............. G06Q 10/0635 |
| | | | 705/7.28 |
| 2009/0182653 | A1 | 7/2009 | Zimiles |
| 2010/0114634 | A1* | 5/2010 | Christiansen .......... G06Q 10/06 |
| | | | 705/7.28 |
| 2011/0295988 | A1* | 12/2011 | Le Jouan ............ G06F 21/6254 |
| | | | 709/223 |
| 2013/0006684 | A1* | 1/2013 | Carter .................... G06Q 10/00 |
| | | | 705/7.11 |
| 2013/0103555 | A1* | 4/2013 | Carter .................... G06Q 40/06 |
| | | | 705/30 |
| 2013/0179215 | A1* | 7/2013 | Foster .................... G06Q 10/00 |
| | | | 705/7.28 |
| 2014/0279486 | A1 | 9/2014 | Kessler |
| 2015/0073929 | A1* | 3/2015 | Psota .................... G06Q 50/28 |
| | | | 705/26.2 |
| 2015/0178708 | A1 | 6/2015 | Reutov |
| 2015/0365288 | A1 | 12/2015 | Van Der Merwe et al. |
| 2016/0134654 | A1* | 5/2016 | Ghent ................ G06F 16/9024 |
| | | | 726/25 |
| 2016/0321582 | A1* | 11/2016 | Broudou ................ G06N 5/025 |
| 2017/0006135 | A1* | 1/2017 | Siebel ...................... G06F 8/10 |
| 2021/0342836 | A1* | 11/2021 | Celia ...................... G06N 7/005 |

\* cited by examiner

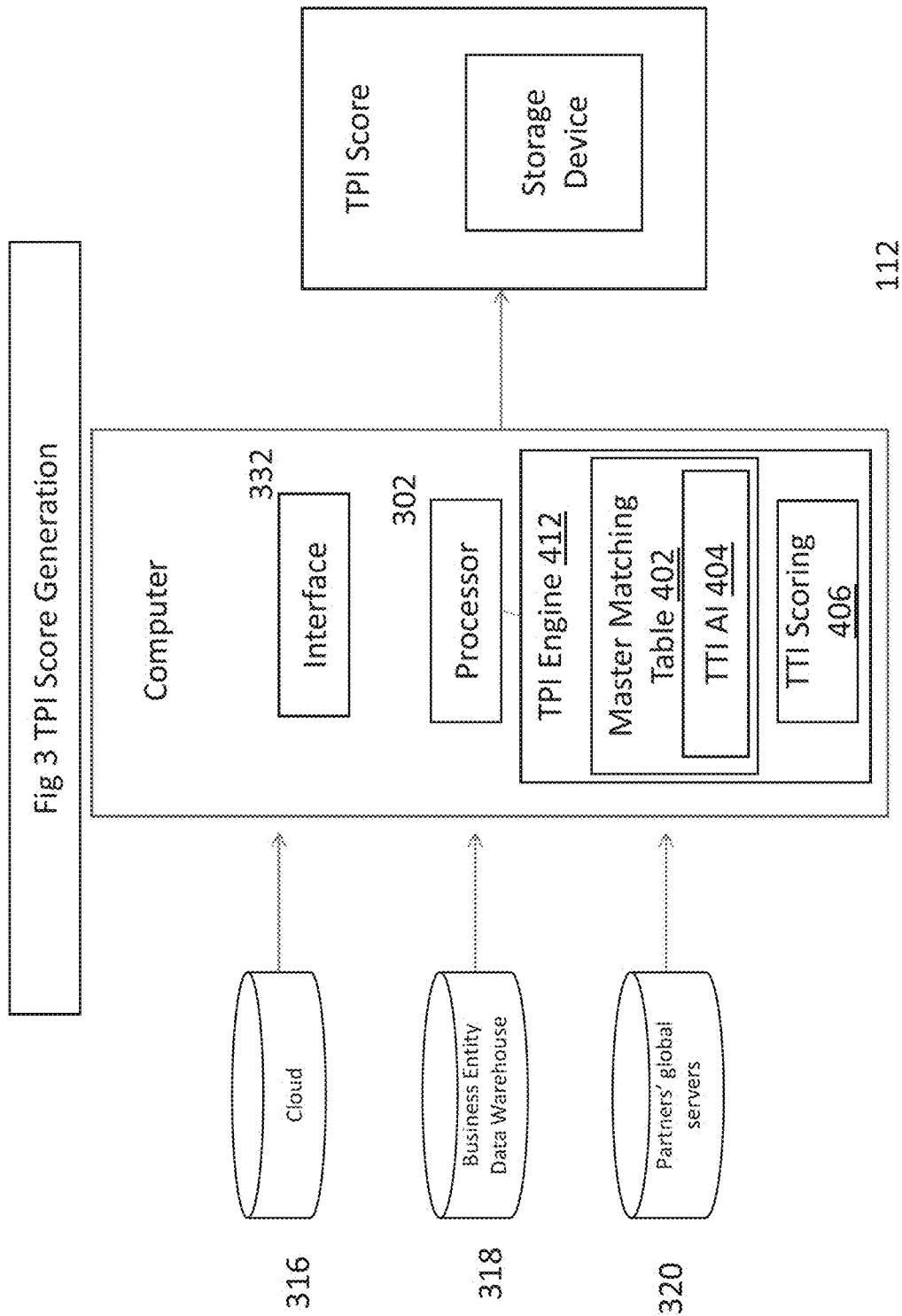

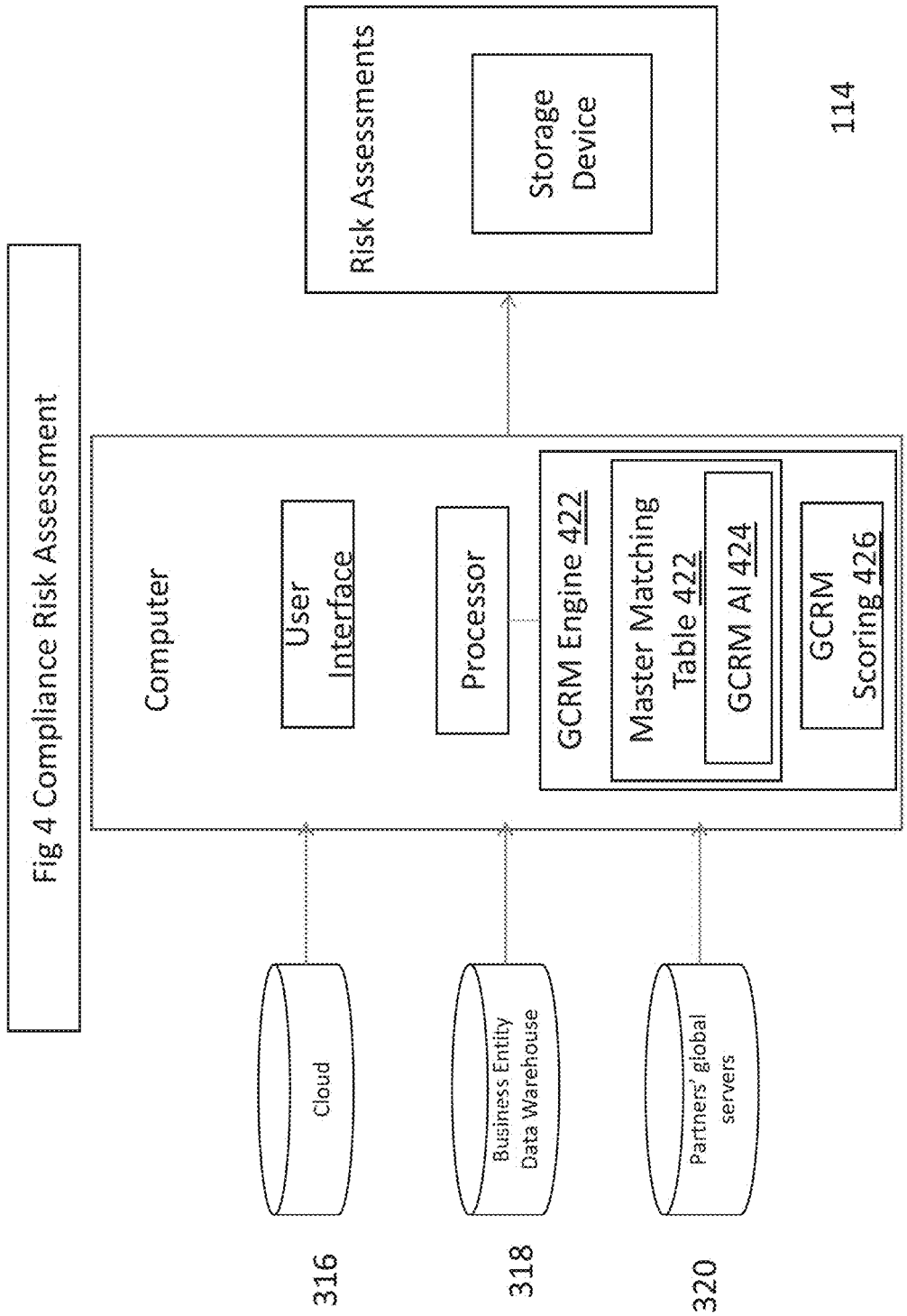

SYSTEM AND METHOD FOR GLOBAL THIRD PARTY INTERMEDIARY IDENTIFICATION SYSTEM WITH ANTI-BRIBERY AND ANTI-CORRUPTION RISK ASSESSMENT

CROSS-REFERENCE TO RELATED APPLICATIONS

The present application claims priority to U.S. Provisional Patent Application No. 62/480,869, filed on Apr. 3, 2017, the entirety of which is incorporated by reference hereby.

TECHNICAL FIELD AND DESCRIPTION OF THE RELATED TECHNOLOGY

As businesses move into new markets, they have to rely on local third party intermediaries, or TPIs. Certain countries even require foreign businesses to retain local TPIs. However, with the benefits from TPIs, also comes the compliance risk in bribery and corruption. Ninety percent (90%) of US Foreign Corrupt Practices Act (FCPA) investigations brought by the US Department of Justice involve TPIs. Government regulations (e.g.: US FCPA, Anti-Money Laundering rules, UK Bribery Act) penalize businesses for violations by third parties, even when businesses are not aware of such activities, especially when no compliance procedures are found in place.

Companies first face the difficulties to identify among its suppliers, distributers, service providers and other potential TPIs that do business with local governments. TPIs are exposed more to compliance risks. What is needed is a tool to identify and provide information on general compliance risk assessment of likely TPIs.

Currently, companies have to use manual methods to have individual incoming/new third party companies (existing ones are too large to handle) self-report whether they are TPIs, for example with questionnaires, and manually go through each questionnaire to verify.

Not only is this method slow, expensive and covers only new third parties, there are critical flaws. For example, all TPIs found this way are self-reported, leaving out those unreported TPIs who are more likely to be at high compliance risk. Companies either have to randomly select small part of third parties because of budget constraints and miss most risky third parties, or though they may be able to cover their small third party base via manual methods, they have to waste their efforts on non-TPIs or on low risk third parties.

SUMMARY

A Third Party Intermediary (TPI) is a business entity (an agent, service provider, consultant, contractor, or other third party) employed or engaged or retained to assist a company in any function of the business that requires or involves interaction with any level of government in any of the countries.

Disclosed are embodiments of technology for an identification system that flags business entities that are current or future TPIs. In at least one embodiment, the system is configured for TPI identification to enable companies to optimize compliance efforts, for example, effective anti-bribery and anti-corruption compliance. The system is configured to identify TPI likelihood and General Compliance Risk (GCR) Rating to enable businesses to setup anti-bribery and anti-corruption (ABAC) strategies to focus on those high-risk TPIs, perform due diligence, and mitigate compliance risk.

In at least one embodiment, the system is configured with a dual-engine structure configured for optimal speed and data processing by employing parallel processing, to identify and provide risk ratings for likely TPIs.

The first engine is a TPI identification engine configured to process data, including business entity data from a business information database, and is further configured with artificial intelligence (AI) machine learning modules for adaptive learning, including supervised and unsupervised machine learning algorithms for identifying TPIs. The TPI Engine can operate employing a mainframe computer(s) that update less frequently and handle a greater variety of data formats than massive data processors. The TPI Engine can also be configured to process "Big Data," including business entity data, for example on a HADOOP platform, including both big data processing components and multi-purpose computer servers together with mainframe computer(s) to include processing of more complex databases. The TPI engine processors can process independently of the second GCRM Engine.

The second engine of the system is a for General Compliance Risk Management (GCRM) Engine configured for General Compliance Risk Scoring, and is configured to generate and apply a risk rating to each business entity. In at least one embodiment, for the purpose of consistency in cross-country risk assessment so that ratings in various countries can be compared on the same footing, the system is configured to ingest and process various public/and internal global country scores, as well as business entity data and risk scores. The second engine is configured with independent processors to process "Big Data," including proprietary business entity data, and is further configured with artificial intelligence (AI) machine learning modules for adaptive learning, including supervised and unsupervised machine learning algorithms.

One advantage is that the system provides enhanced performance results, e.g., faster searching, matching, etc. that shortens the standard search time from hours or days to milliseconds.

Another advantage is the system provides complete databases for TPI risk analytics that solve the deficient database systems that have missing data attributes or missing values for extant data attributes. Conventional systems attempt to address database incompleteness with data vendors or manual investigation.

Another advantage is for compliance risk identification, assessment and mitigation, the system enables compliance efforts in anti-bribery and anti-corruption that previously required human subjective input and self-reporting, thus the systems solves the problem of faulty and subjective global ABAC compliance resulting from target information scarcity and information bias.

Accordingly, the present disclosure describes embodiments that significantly alleviate incompleteness and possible bias in small business entities data and in compliance data. For example, the improved databases solve at least four kinds of database deficiencies from missing data attributes or types, missing data values, data scarcity for targets, and biased information about targets. Moreover, the present disclosure provides solutions based on AI and machine learning intelligence such that, in embodiments, the system is configured to identify TPI and provide GCRM risk analysis that both replaces and improves upon prior systems and manual investigative methods, including the self-reporting described above. Without the present system, users either have to randomly select a small part of third parties because of budget constraints and miss out most risky third parties, or though they may be able to cover their small third party base, will waste their efforts on non-TPIs or on low risk third parties.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIG. 3 shows an embodiment of a network computer for a TPI Engine that can be included in a system such as that shown in FIG. 1;

FIG. 4 shows an embodiment of a network computer for a GCRM Engine that can be included in a system such as that shown in FIG. 1;

DETAILED DESCRIPTION OF THE EMBODIMENTS

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" or "in an embodiment" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "Host" can refer to an individual person, partnership, organization, or corporate entity that can own or operate one or more services for providing TPI identification and risk rating (e.g., web sites, mobile applications, or the like).

The following briefly describes embodiments in order to provide a basic understanding of some aspects of the innovations described herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

Illustrative Operating Environment

Figure 1:
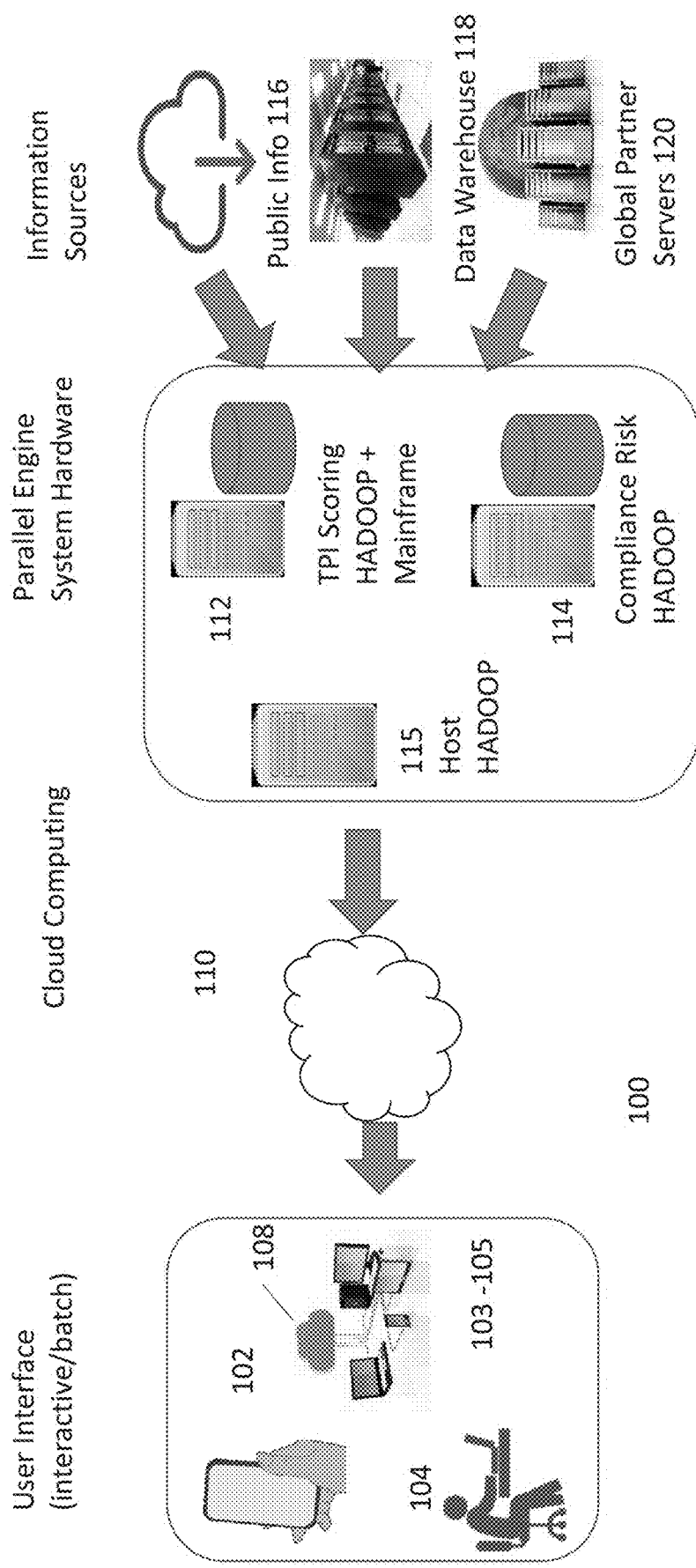
FIG. 1 is a system diagram of an environment in which at least one of the various embodiments can be implemented.

FIG. 1 shows components a logical architecture of system 100 of one embodiment of an environment in which embodiments of the innovations described herein can be practiced. Not all of the components may be required to practice the innovations, and variations in the arrangement and type of the components can be made without departing from the spirit or scope of the innovations. As shown, system 100 of FIG. 1 includes local area networks (LANs)/wide area networks (WANs)-(network) 110, wireless network 108, client computers 102-105, TPI Scoring Server Computer 112, and Compliance Risk Server Computer 114 and Hosting Server Computer 115.

In at least one of the various embodiments, Hosting Server Computer 115, can include one or more computers, such as, network computer 300, or the like, that host one or more applications for providing TPI identification scores and risk assessment ratings to client users. For example, hosting servers 115 can include one or more web servers providing web sites, images hosting sites or the like. In at least one of the various embodiments, Hosting Server Computer 115 can be arranged to integrate with TPI Scoring Server Computer 112, and Compliance Risk Server Computer 114.

As shown in FIG. 1, this system takes in information from public information sources 116 such as social media information, public media servers, information and reporting services and of the like. In at least one of the various embodiments, public information services 116 can include one or more third-party and/or external content provider services. Public information services 116 can include, for example social network platforms, media distribution platforms, court reporters, regulatory reporters, government data, or the like. In at least one of the various embodiments, public information services 115 can be arranged to integrate and/or communicate with TPI Scoring Server Computer 112, and Compliance Risk Server Computer 114 using APIs or other communication interfaces provided by the services. For example, a content provider service can offer a HTTP/REST based interface that enables the TPI Scoring Server Computer 112 to obtain data that can be associated with business entities analyzed by the TPI Scoring Server Computer 112 or Compliance Risk Server Computer 114.

In at least one of the various embodiments, Business Entity Analytics Server 118 can be one or more computers arranged to provide business entity analytics, such as, network computer FIG. 3, or the like. As described herein, Business Entity Analytics Server 118 can include a database of robust company/business entity data and employee data databases. Examples of Business Entity Analytics Servers 118 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein. In at least one of the various embodiments, Business Entity Analytics Servers 118 can be arranged to integrate and/or communicate with TPI Scoring Server Computer 112, and Compliance Risk Server Computer 114 using APIs or other communication interfaces provided by the services. For example, Business Entity Analytics Servers 118 service can offer a HTTP/REST based interface that enables the TPI Scoring Server Computer 112 and the Compliance Risk Server Computer 114 to obtain data that can be associated with business entities analyzed by the TPI Scoring Server Computer 112 and Compliance Risk Server Computer 114.

Global Partner Server 120 can include local or regional computers that include data on local companies. Global Partner Server 120 can be configured to integrate with TPI Scoring Server Computer 112, and Compliance Risk Server Computer 114 and/or Host Server Computer 115 using API's or other communication interfaces provided by Global Partner Servers 120, for example, via a centralized File Transfer Protocol site/server. In an embodiment, TPI Scoring Server Computer 112, Compliance Risk Server Computer 114, or other computer server can include Global Data Selection (e.g. formatting), Conversion (e.g. date reporting formats (age, year, month), or Derived Variable Creation Modules (e.g.: conversion rates, derived ratios) to normalize data to factors used in analyzing data.

At least one embodiment of client computers 102-105 is described in more detail below 2. In one embodiment, at least some of client computers 102-105 can operate over a wired and/or wireless network, such as networks 110 and/or 108. Generally, client computers 102-105 can include virtually any computer capable of communicating over a network to send and receive information, perform various online activities, offline actions, or the like. In one embodiment, one or more of client computers 102-105 can be configured to operate within a business or other entity to perform a variety of services for the business or other entity. For example, client computers 102-105 can be configured to operate as a web server or the like. However, client computers 102-105 are not constrained to these services and can also be employed, for example, as an end-user computing node, in other embodiments. It should be recognized that more or less client computers can be included within a system such as described herein, and embodiments are therefore not constrained by the number or type of client computers employed.

Computers that can operate as client computer 102-105 can include computers that typically connect using a wired or wireless communications medium such as personal computers, multiprocessor systems, microprocessor-based or programmable electronic devices, network PCs, or the like. In some embodiments, client computers 102-105 can include virtually any portable personal computer capable of connecting to another computing device and receiving information such as, laptop computer 103, smart mobile telephone 104, and tablet computers 105, and the like. However, portable computers are not so limited and can also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 can access various computing applications, including a browser, or other web-based application.

A web-enabled client computer can include a browser application that is configured to receive and to send web pages, web-based messages, and the like. The browser application can be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer can employ the browser application to perform various activities over a network (online). However, another application can also be used to perform various online activities.

Client computers 102-105 can also include at least one other client application that is configured to receive and/or send content between another computer. The client application can include a capability to send and/or receive content, or the like. The client application can further provide information that identifies itself, including a type, capability, name, and the like. In one embodiment, client computers 102-105 can uniquely identify themselves through any of a variety of mechanisms, including an Internet Protocol (IP) address, a phone number, Mobile Identification Number (MIN), an electronic serial number (ESN), or other device identifier. Such information can be provided in a network packet, or the like, sent between other client computers, TPI Scoring Server Computer 112, Compliance Risk Server Computer 114, Host Server Computer 115 or other computers.

Client computers 102-105 can further be configured to include a client application that enables an end-user to log into an end-user account that can be managed by another computer, such as TPI Scoring Server Computer 112, Compliance Risk Server Computer 114, Host Server Computer 115 or the like. Such end-user account, in one non-limiting example, can be configured to enable the end-user to manage one or more online activities, including in one non-limiting example, search activities, social networking activities, browse various websites, communicate with other users, or the like. However, participation in such online activities can also be performed without logging into the end-user account.

Wireless network 108 is configured to couple client computer(s) 103-105 and its components with network 110. Wireless network 108 can include any of a variety of wireless sub-networks that can further overlay stand-alone ad-hoc networks, and the like, to provide an infrastructure-oriented connection for client computer(s) 103. Such sub-networks can include mesh networks, Wireless LAN (WLAN) networks, cellular networks, and the like. In one embodiment, the system can include more than one wireless network.

Wireless network 108 can further include an autonomous system of terminals, gateways, routers, and the like connected by wireless radio links, and the like. These connectors can be configured to move freely and randomly and organize themselves arbitrarily, such that the topology of wireless network 108 can change rapidly.

Wireless network 108 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile devices, such as client computers 103-105 with various degrees of mobility. In one non-limiting example, wireless network 108 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 can include virtually any wireless communication mechanism by which information can travel between client computers 103-105 and another computer, network, and the like.

Network 110 is configured to couple network computers with other computers and/or computing devices, including, TPI Scoring Server Computer 112, Compliance Risk Server Computer 114, Host Server Computer 115, client computers 102-05 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 can be configured to transport information of an Internet Protocol (IP). In essence, network 110 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TPI Scoring Server Computer 112 is described in more detail below in conjunction with FIG. 2 and FIG. 3. Briefly, however, TPI Scoring Server Computer 112 includes any network computer capable of performing TPI scoring and machine learning analysis as described herein. Computers that can be arranged to operate as TPI Scoring Server Computer 112 include various network computers, including, but not limited to personal computers, desktop computers, multiprocessor systems, microprocessor-based or programmable consumer electronics, network PCs, server computers, network appliances, and the like.

Although FIG. 1 illustrates TPI Scoring Server Computer 112 as a single computer, the embodiments are not so limited. For example, one or more functions of the TPI Scoring Server Computer 112 can be distributed across one or more distinct network computers. Moreover, TPI Scoring Server Computer 112 can include a number of configurations. Thus, in one embodiment, TPI Scoring Server Computer 112 can contain a plurality of network computers. In another embodiment, TPI Scoring Server Computer 112 can contain a plurality of network computers that operate using a master/slave approach, where one of the plurality of network computers of TPI Scoring Server Computer 112 is operative to manage and/or otherwise coordinate operations of the other network computers. In other embodiments, the TPI Scoring Server Computer 112 can operate as a plurality of network computers arranged in a cluster architecture, a peer-to-peer architecture, and/or within a cloud architecture. Thus, embodiments are not to be construed as being limited to a single environment, and other configurations, and architectures are also envisaged.

For example, in at least one of the various embodiments, TPI Server Computer 112 can operate employing mainframe computer(s). In an embodiment, the TPI Engine can be configured to include one or more mainframe computer network servers; the TPI Engine mainframes can be configured to update less frequently than the GCRM engine and/or other massive data processor. Thus, the independent processors for the engines require less overall processing power, and the dual processing structure can advantageously provide optimal system load without sacrificing overall speed or data processing on both paths. Moreover, a TPI engine mainframe can be configured to directly accept and process a greater variety of conventional formats for data without the need for additional data cleansing or other conversion, in contrast to a big data processing computer system. In at least one of the various embodiments, TPI Server Computer 112 can operate including both big data processing components and multi-purpose computer servers, such as a HADOOP system architecture together with mainframe computer(s) to include processing of more complex databases; the TPI engine processors can still process independently of the GCRM Server Computer.

One embodiment of Compliance Risk Server Computer 114 is described in more detail below in conjunction with FIG. 2 and FIG. 4. Briefly, however, Compliance Risk Server Computer 114 includes virtually any network computer capable of Compliance Risk delivery.

Although FIG. 1 illustrates Compliance Risk Server Computer 114 as a single computer, the various embodiments are not so limited. For example, one or more functions of the Compliance Risk Server Computer 114 can be distributed across one or more distinct network computers. Moreover, Compliance Risk Server Computer 114 is not limited to a particular configuration. Thus, in one embodiment, Compliance Risk Server Computer 114 can contain a plurality of network computers. In another embodiment, Compliance Risk Server Computer 114 can contain a plurality of network computers that operate using a master/slave approach, where one of the plurality of network computers of Compliance Risk Server Computer 114 operates to manage and/or otherwise coordinate operations of the other network computers. In other embodiments, the Compliance Risk Server Computer 114 can operate as a plurality of network computers within a cluster architecture, a peer-to-peer architecture, and/or within a cloud architecture. In an embodiment, Compliance Risk Server Computer 114 are configured in a HADOOP System. Thus, embodiments not to be construed as being limited to a single environment, and other configurations, and architectures are also envisaged.

For example, in at least one of the various embodiments, Compliance Server Computer 114 has an independent processing system, for example a massive big data processing architecture such as a HADOOP system or other mass data processor, in order to process data independently from the TPI engine for, inter alia, parallel processing. The Compliance Server Computer 114 can be configured for committed big data processing such that a GCRM Engine, databases, and AI master matching table can take in the larger complex data set for optimal risk assessment.

One embodiment of Host Server Computer 115 is described in more detail below in conjunction with FIG. 2. Host Server Computer 115 includes virtually any network computer capable of integrating and further processing results from TPI Server Computer 112, Compliance Server Computer 114 as well as interfacing with client computers. Computers that can be arranged to operate as Host Server Computer 115 include various network computers desktop computers, multiprocessor systems, microprocessor-based or programmable consumer electronics, network PCs, server computers, network appliances, and the like.

Although FIG. 1 illustrates Host Server Computer 115 as a single computer, the various embodiments are not so limited. For example, one or more functions of the Host Server Computer 115 can be distributed across one or more distinct network computers. Moreover, Host Server Computer 115 is not limited to a particular configuration. Thus, in one embodiment, Host Server Computer 115 can contain a plurality of network computers. In another embodiment, Host Server Computer 115 can contain a plurality of network computers that operate using a master/slave approach, where one of the plurality of network computers of Compliance Risk Server Computer 114 operates to manage and/or otherwise coordinate operations of the other network computers. In other embodiments, the Host Server Computer 115 can operate as a plurality of network computers within a cluster architecture, a peer-to-peer architecture, and/or within a cloud architecture. In an embodiment, Host Server Computer 115 are configured in a HADOOP System. Thus, embodiments not to be construed as being limited to a single environment, and other configurations, and architectures are also envisaged.

For example, in at least one of the various embodiments, Host Server Computer 115 includes a massive big data processing architecture such as a HADOOP system or other mass data processor, in order to process data from both a TPI engine of a TPI Server Computer 112 and a GCRM Engine of a Compliance Risk Server Computer 114 as well as generating and serving combined scoring and batch processing of scores.

Illustrative Network Computer

Figure 2:
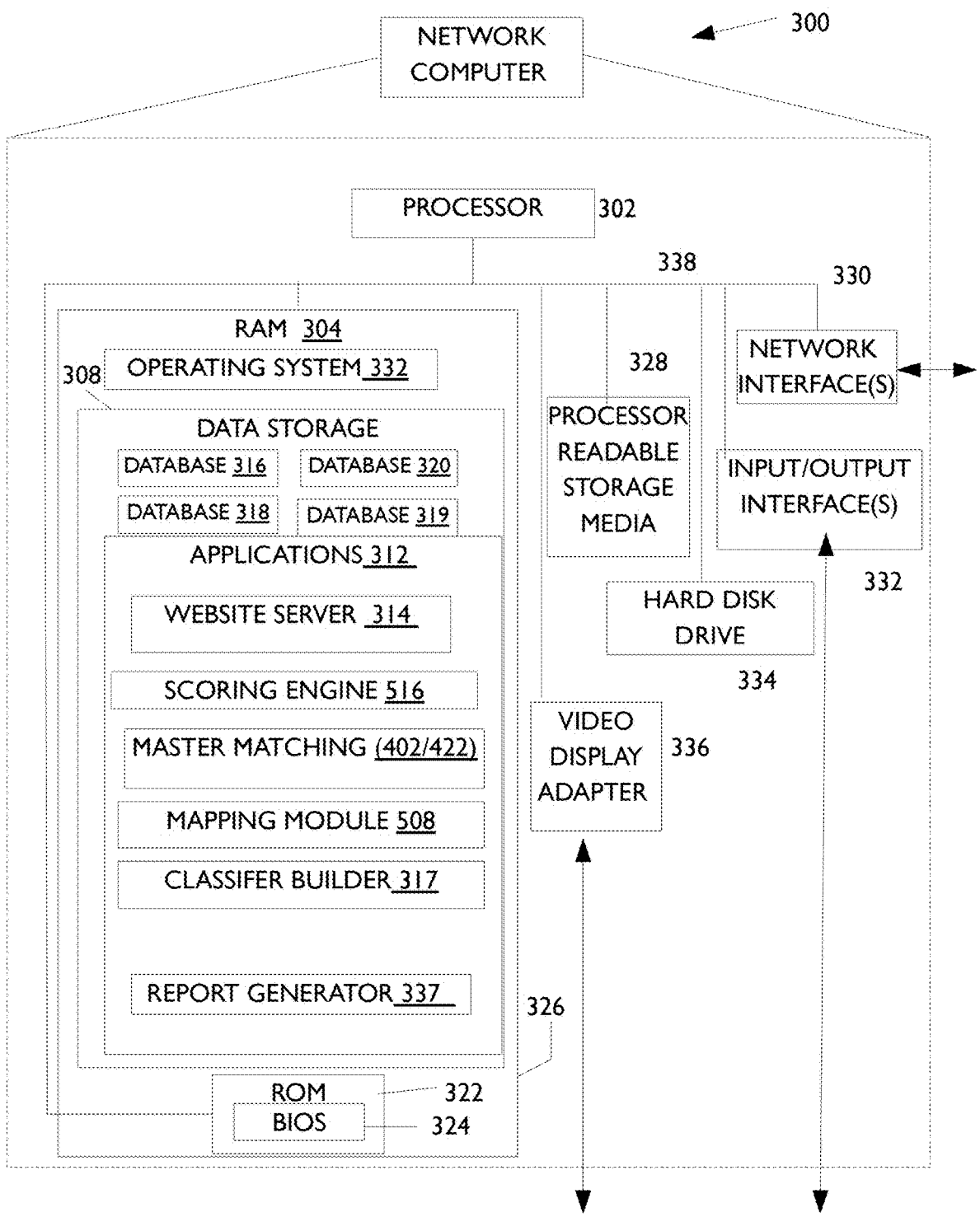
FIG. 2 shows an embodiment of a network computer that can be included in a system such as that shown in FIG. 1.

FIG. 2 shows one embodiment of a network computer 300. Network computer 300 can include many more or less components than those shown. The components shown, however, are sufficient to disclose an illustrative embodiment. Network computer 300 can be configured to operate as a server, client, peer, a host, or any other computer. Network computer 300 can represent, for example TPI Scoring Server Computer 112, Compliance Risk Server Computer 114 and/or Host Computer 115, of FIG. 1, and/or other network computers. As described herein, TPI Scoring Server Computer 112 and Compliance Risk Server Computer 114 are each configured with their own logical processing for parallel processing as described herein.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 can include one or more central processing units.

As illustrated in FIG. 2, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 2. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system can be employed. Basic input/output system (BIOS) 324 is also provided for controlling the low-level operation of network computer 300.

Although illustrated separately, memory 326 can include processor readable storage media 328. Processor readable storage media 328 can be referred to and/or include computer readable media, computer readable storage media, and/or processor readable storage device. Processor readable storage media 328 can include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 312 and/or other data such as content 310. For example, data storage 308 can also be employed to store information that describes various capabilities of network computer 300. The information can then be provided to another computer based on any of a variety of events, including being sent as part of a header during a communication, sent upon request, or the like. Data storage 308 can also be employed to store messages, web page content, or the like. At least a portion of the information can also be stored on another component of network computer 300, including, but not limited to processor readable storage media 328, hard disk drive 334, or other computer readable storage medias (not shown) within client computer 300.

Data storage 308 can include a database, text, spreadsheet, folder, file, or the like, that can be configured to maintain and store user account identifiers, user profiles, email addresses, IM addresses, and/or other network addresses; or the like.

Data storage 308 can further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 can also include a business entity information database 318 of robust company/business entity data to map company firmographic data from a business entity analytics server 118 as described herein. In at least one of the various embodiments, the firmographic data from the business entity information database 318 can include scores or other rankings for companies. In at least one of the various embodiments the business entity information database 318 can include one or more databases linked to business entity information, for example an employee database including employee names and title or management code, a contact database of contacts for employees of companies (e.g. email, mobile device IDs, phone), or a cookie database of data compiled from cookies a business entity uses for digital tracking and digital campaigns. Data from database 318 can be mapped to companies using a mapping module 508. In at least one of the various embodiments, if the company name is not identified in the business entity database the system can be configured to generate an identifier and a generate one or more firmographic databases for the company. Non limiting examples of company entity data linking, generating firmographic databases and scoring for companies, and data integration by business entity information database 304 and business analytics server are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

Data Storage 308 can also include a classifier data store 319 comprising a set of classifiers, which can be provided to a TPI master matching table 402 and GCRM master matching table 422 for AI enabled score and rating as described herein.

Applications 312 can include computer executable instructions, which can be loaded into mass memory and run on operating system 306. Examples of application programs can include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 can also include website server 314, classifier builder 317, and Applications 312 for a TPI Engine Computer Server 112 (FIG. 3), and a General Compliance Risk Management (GCRM) Server Computer (FIG. 4).

Website server 314 can represents any of a variety of information and services that are configured to provide content, including messages, over a network to another computer. Thus, website server 314 can include, for example, a web server, a File Transfer Protocol (FTP) server, a database server, a content server, or the like. Website server 314 can provide the content including messages over the network using any of a variety of formats including, but not limited to WAP, HDML, WML, SGML, HTML, XML, Compact HTML (cHTML), Extensible HTML (xHTML), or the like.

Applications can include a classifier model building application 317. Artificial Intelligence (AI) machine learning and processing, including AI machine learning classification can be based on any of a number of known machine learning algorithms, including classifiers such as the classifiers described herein (e.g., cluster, K-means cluster, decision tree, random forest decision tree, gradient boosted trees machine, propositional rule learner, linear regression, neural nets, synthetic minority over-sampling technique (SMOTE), support vector machines (SVM), etc.).

In at least one embodiment, the system AI is configured to identify likely TPIs by correlation with known TPIs. Even where a number of known TPIs is small or scarce, the TPI engine can employ the master matching table and AI machine learning engine to identify likely TPIs. For example, where initially there are 69 known TPIs available from past compliance efforts in a large global third party portfolio, conventional risk analytics would be unable to use such a small number assess compliance risk. Accordingly, in an embodiment, the system can be configured supervised machine learning employing a AI classifier, for example a Balanced Random Forest, SMOTE, SVM, Neural Nets, etc.

For example, in an embodiment, the system can be configured to employ a clustering algorithm on a training database to group companies identified as TPIs and unidentified companies to generate classes and classifiers for TPI identification. The classifier results can then be compared against databases of known TPI companies to confirm accuracy and refine the classifiers. In at least one of the various embodiments Training databases can be compiled by mapping business entity data from business entity databases and other databases as described herein to pre-identified TPI companies to create weights for factors in TPI identification, for example, firmographics, business entity analytical scoring, past financial statements (e.g.: 5 year window), legal indicators and Business Linkage information.

In embodiments, different machine learning algorithms can be run on the same database and then the results confirmed by supervision to identify the best AI for different datasets, as described herein.

For example, in training a classifier for a TPI engine's master matching table, it was found that where a given region or company is correlated with the company, in one embodiment, the TPI engine can employ a Random Forest algorithm, which is used for 70% of regions identified, where the remaining 30% of regions employ a Scorecard algorithm classifier because of data quality and data coverage.

In another example, in training classifiers for a GCRM engine, it was found, in one embodiment, that the GCRM engine can employ a Random Forest algorithm for 70% of regions identified, where the remaining 30% of regions can be split between SVM and Gradient Boosting The system can also be configured to use AI to determine which classifiers produce the better scoring. Moreover, over time classifiers can be periodically reapplied and results reconfirmed to find the best classifiers for additional and changing data sets and windows.

As shown in FIG. 3, Applications 312 for a TPI Computer Server 112 comprises a Third Party Identification Engine 412, TPI master matching table 402, TPI classifier AI store 404, and TPI Scoring Generator 406. Applications 312 for a Third Party Identification Engine 412 can employ processes, or parts of processes, similar to those described in conjunction with FIGS. 5A-6, to perform at least some of its actions. In an embodiment, processes and applications shown for the TPI Computer Server 112 can configured for standard mainframe computers and supercomputers due to the standard compatibility with, inter alia, partner global server computers 120 and public computers. In an embodiment, these are run in parallel with separate processors from the General Compliance Risk Computer server 114, as the latter is configured for massive data processing, for example in a HADOOP system, due to the massive data processing involved for GCRM Engine applications.

Figure 5A:
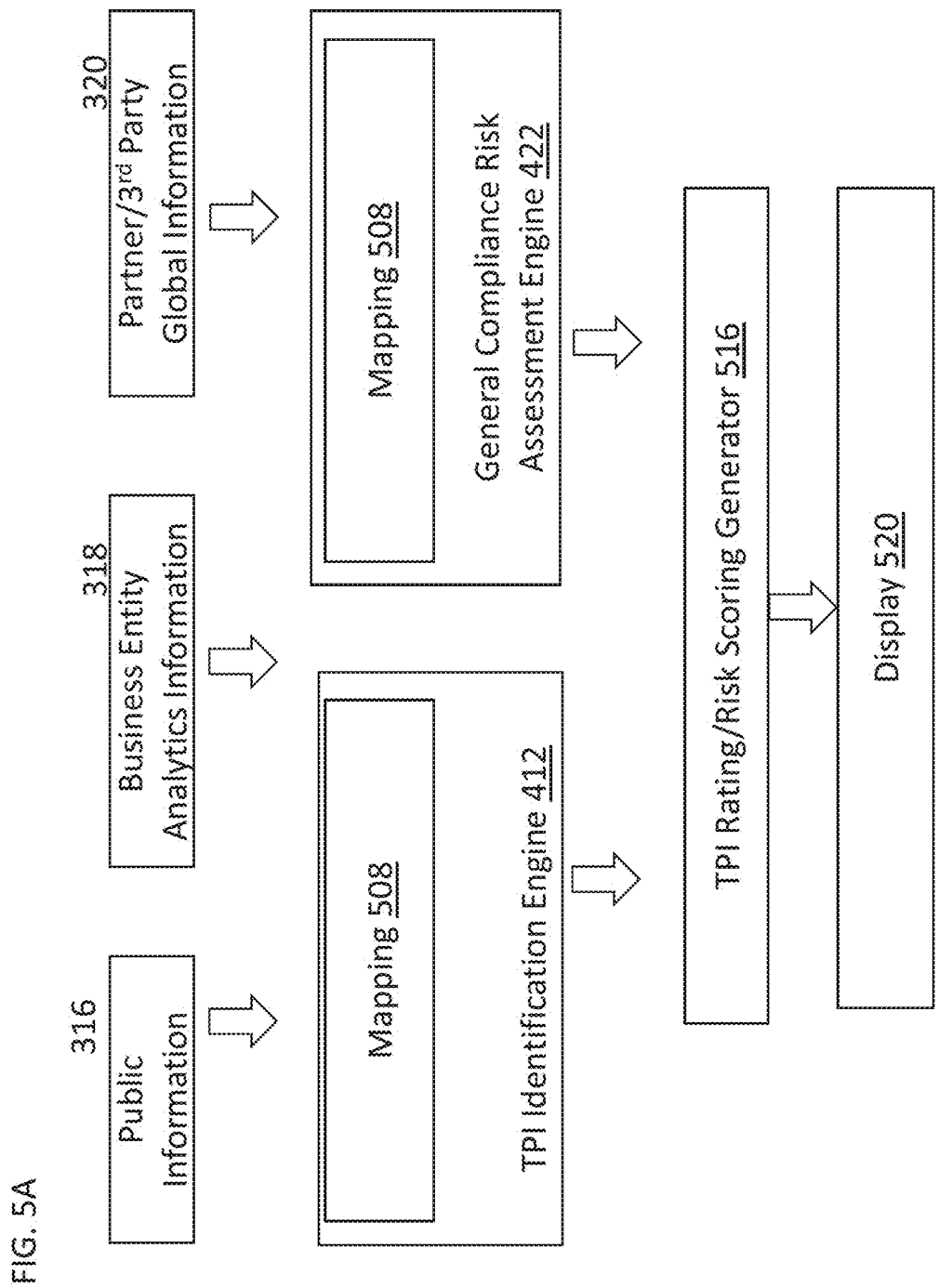
FIGS. 5A-5B illustrate a logical architecture flow of a system in accordance with at least one of the various embodiments.
Figure 5B:
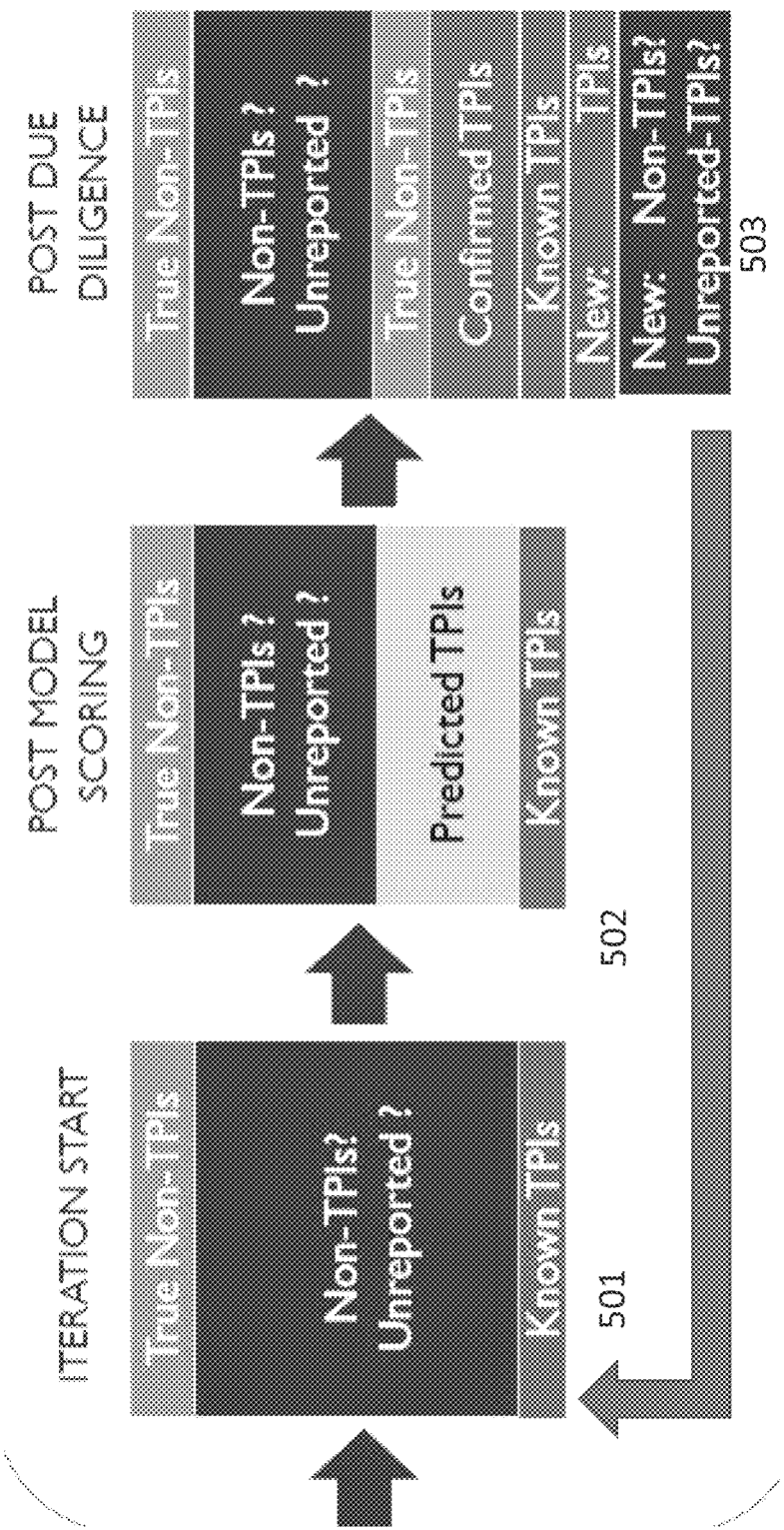
Figure 6:
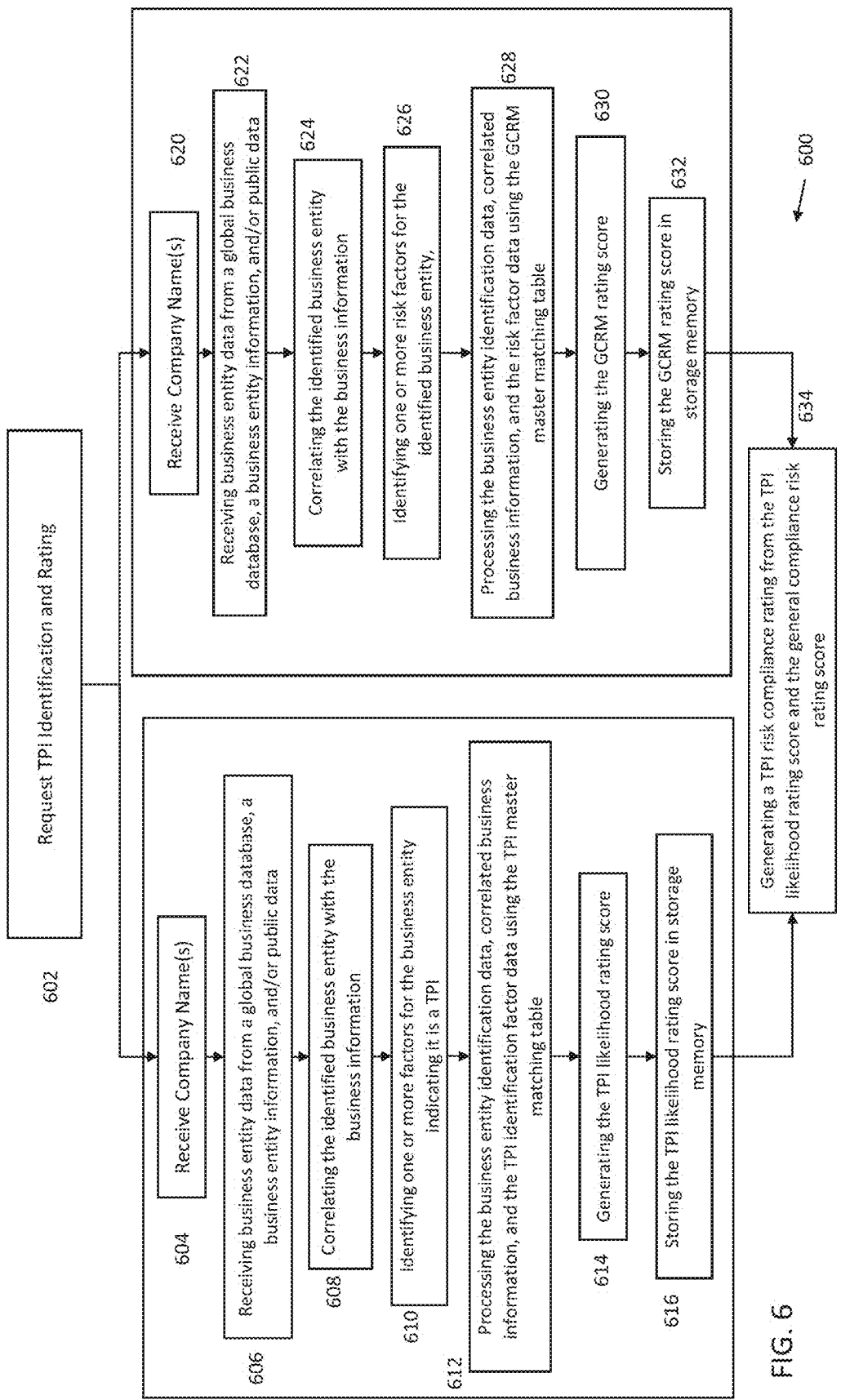
FIG. 6 illustrates a flowchart for a process in accordance with at least one of the various embodiments.

As shown in FIG. 4, Applications 312 for a General Compliance Risk Computer server 114 comprise a GCRM Engine 422, GCRM master matching table 422, CGRM classifier AI store 424, and a GCRM Scoring Generator 426 Applications 312 for a General Compliance Risk Computer server 114 can employ processes, or parts of processes, similar to those described in conjunction with FIGS. 5A-6, to perform at least some of its actions. In an embodiment, processes and applications shown for General Compliance Risk Computer server 114 is configured for massive data processing, for example in a HADOOP system, due to the massive data processing involved for GCRM Engine applications. In an embodiment, these are run in parallel with separate processors from the TPI Computer Server 112 comprising a Third Party Identification Engine 412, as the latter can be configured to run by including standard computer and supercomputer mainframes.

FIG. 5A represents a logical architecture for system 500 for TPI rating and GCRM Assessment scoring in accordance with at least one of the various embodiments. In at least one of the various embodiments, data from one or more sources, such as, public information source 316, business entity information source 318, or global partner sources 320 can be retrieved.

In at least one of the various embodiments, data that can be received and/or determined from one or more data sources can be processed in a mapping component 508. In at least one of the various embodiments, where there are disparate sources of data, data events can be defined using dissimilar criteria and/or definitions. Further, in at least one of the various embodiments, the various event sources can provide event information using a variety of data formats and/or communication protocols. Thus, mapping component 508 can be arranged to map to events into one or more matching tables of the respective engines. In at least one of the various embodiments, this mapping can normalize events that can be received from disparate event sources.

In at least one of the various embodiments, mapping component 508 can be arranged to use one or more filters, tests, rules, regular expressions, pattern matches, lookup tables, heuristics, or the like, for mapping the determined data to the matching table. In some embodiments, mapping component 508 can be arranged to determine the particular, filters, tests, rules, regular expressions, pattern matches, lookup tables, heuristics, or the like, for mapping data based on the data source. In at least one of the various embodiments, information for each table can be stored using well-known data structures such as objects, hashes, arrays, linked lists, or the like. In at least one of the various embodiments, the information can be stored in a database and associated with each business that corresponds to the tables and scoring that is associated with the master matching table.

Thousands of information items can be used by the Computer Server 112 and the machine learning AI. For example, an exemplary listing of 100 illustrative data information attributes that can be employed by the system is shown in Table 1. The data can be pulled from public information source 316, business entity information source 318, or global partner sources 320. Data items can cover data systems including
1) firmgraphics,
2) financials,
3) trade/payment,
4) social media,
5) compliance violations,
6) public information
7) business entity scores and ratings

TABLE 1

| # | Information |
|---|---|
| 1 | Company Name |
| 2 | Primary Address Street Address |
| 3 | Primary Town/City Name |
| 4 | Primary County Name |
| 5 | Legal Form Text |
| 6 | Organization Operating Status Code |
| 7 | Employees Total |
| 8 | Legal Structure |
| 9 | Subsidiary Indicator |
| 10 | Primary SIC |
| 11 | Facility Owned/Rented |
| 12 | Date Started Under Current Management |
| 13 | Import Indicator |
| 14 | Export Indicator |
| 15 | Family Tree Member Role 1 Text |
| 16 | Family Tree Member Role 2 Text |
| 17 | Family Tree Member Role 3 Text |
| 18 | Family Tree Member Role 4 Text |
| 19 | Financial Statement Date |
| 20 | Total Current Assets Amount |
| 21 | Working Capital Amount |
| 22 | Employee Deduction Amount |
| 23 | Interest Payable Amount |
| 24 | Net of Tax Amount |
| 25 | Sales Revenue Amount |
| 26 | Total Current Liabilities Amount |
| 27 | Gross Profit/Loss Amount |
| 28 | Net Income |
| 29 | Profit Margin |
| 30 | Dividends |
| 31 | Stock Turnover (Inventory Turnover) |
| 32 | Intangible amortisation Amount |
| 33 | Depreciation (amortisation) |
| 34 | Solvency Ratio (industry quartile) |
| 35 | Current Ratio |
| 36 | Quick Ratio |
| 37 | Cost of Goods Sold |
| 38 | Other Operating Expense Amount |
| 39 | Net Profit Before Taxes |
| 40 | Interest Receivable Amount |
| 41 | Company Employee Count |
| 42 | Capital Stock Amount |
| 43 | Reserve Fund Amount |
| 44 | Total Fixed Assets Amount |
| 45 | Total Assets Amount |
| 46 | Net Worth Amount |
| 47 | Operating Cash Flow |
| 48 | Total Liabilities Amount |
| 49 | D&B Data Depth |
| 50 | On Government Procurement List |
| 51 | Country Risk Rating |
| 52 | Perceived Corruption Index |
| 53 | # of adverse media coverage in last month |
| 54 | # of adverse media coverage in quarter |
| 55 | # of adverse media coverage in last 6 months |
| 56 | # of adverse media coverage in last year |
| 57 | # of adverse media coverage in last 2 years |
| 58 | # of adverse media coverage in last 3 years |
| 59 | 3-month interest rate current quarter |
| 60 | 3-month interest rate last quarter |
| 61 | Unemployment Rate of Country |
| 62 | GDP growth rate of Country |
| 63 | Failure Raw Score |
| 64 | Delinquency Raw Score |

TABLE 1-continued

| # | Information |
|---|---|
| 65 | D&B Rating |
| 66 | Credit Recommendation |
| 67 | Paydex Score |
| 68 | D&B Global Business Risk score |
| 69 | Number of Payment Experiences with Negative comments |
| 70 | Number of Payment Experiences Slow-Negative |
| 71 | Number of Satisfactory Experiences |
| 72 | Total Number of Experiences with Past Due Amount |
| 73 | Total Amount Past Due |
| 74 | Total Credit Amount |
| 75 | Total Amount Owing |
| 76 | Total amount with negative comment |
| 77 | Total Amount with satisfactory comment |
| 78 | Total Prompt or Better Amount |
| 79 | Total Amount Slow 1-30 Days |
| 80 | Total Amount Slow 31-60 Days |
| 81 | Total Amount Slow 61-90 Days |
| 82 | Total Amount Slow 91-120 Days |
| 83 | Total Amount Slow 121-150 Days |
| 84 | Total Amount Slow 151-180 Days |
| 85 | Total Amount Slow 181+ Days |
| 86 | Bankruptcy Filing Type Text |
| 87 | Bankruptcy Filing Date |
| 88 | Total Open Suits Count |
| 89 | Total Open Suits Amount |
| 90 | Latest Suit Date |
| 91 | Latest Suit Amount |
| 92 | Total Open Judgments Count |
| 93 | Total Judgments Amount |
| 94 | Latest Judgment Date |
| 95 | Latest Judgment Amount |
| 96 | Total Open Claims Count |
| 97 | Total Open Claims Amount |
| 98 | Last Compliance Investigation Category |
| 99 | Last Compliance Investigation Start Date |
| 100 | Last Compliance Investigation Stage |
| ... | ... |

In at least one of the various embodiments, a TPI Engine 412 analysis can include determining business entity information from a data store, such as business entity information source 318. In at least one of the various embodiments, business entity database 318 can include firmographic information (incorporation year, years current management in control, SIC/Industries, number of employees, legal structure (proprietorship), business scoring and rating information (e.g.: marketability indicator, Supplier Risk Indicator (SSI), Tier-N Supplier Chains, Importer/Exporter indicator), historical financial information (e.g. past 5 years), and Business Linkage information (e.g.: headquarters, branch, subsidiary), or the like, associated with a business entity.

In at least one of the various embodiments, TPI Engine 412 analysis can include determining global business entity information from a data store, such as, global partner/third party database 320. In at least one of the various embodiments global partner/third party database 320 includes local data from global businesses, for example business names in local language, and business address including country. In an embodiment, text mining based on names in local language and in English can be employed to create Keyword Indicators that associate a TPI likelihood with different probabilities).

In at least one of the various embodiments, TPI Engine 412 analysis can include determining business entity information from a data store or source, such as, public information databases 316 and sources 116. In at least one of the various embodiments public information databases and sources 320 includes legal status information (e.g.: suits, liens, judgments), social and mass media information (e.g. positive, negative, and neutral scoring of company on social networks and web, trending data, etc.).

In at least one of the various embodiments, GCRM Engine 412 analysis can include determining global business entity risk information from a data store, such as, global partner/third party database 320. In at least one of the various embodiments global partner/third party database 320 risk data includes local data from global businesses, for example individuals and employees associated with companies (e.g.: company directors), compliance warnings/sanctions and stages/seriousness of compliance violations for companies.

In at least one of the various embodiments, GCRM Engine 412 analysis can include determining business entity information from a data store, such as, business entity database 318 from a business entity data source 118. In at least one of the various embodiments, business entity database 318 can include firmographic information (incorporation year, years current management in control, SIC/Industries, number of employees, legal structure (proprietorship), business scoring and rating information (e.g.: marketability indicator, Supplier Risk Indicator (SSI), Tier-N Supplier Chains, Paydex, Out of Business Indicator, Secured Filling Indicator, and Country Risk Indicator), historical financial information (e.g. past 5 years), and Business Linkage information (e.g.: headquarters, branch, subsidiary), or the like, associated with a business entity.

In at least one of the various embodiments, GCRM Engine 412 analysis can include determining business entity information from a data store or source, such as, public information databases 316 and sources 116. In at least one of the various embodiments public information databases and sources 320 includes legal status information (e.g.: suits, liens, judgments), social media information (e.g. positive, negative, and neutral scoring of company on social networks and web, trending data, etc.), Public information (Perceived Corruption Index, Basel Anti-Money Laundering (AML) Index, Office of Foreign Assets Control (OFAC) Sanctioned Countries, Past financial statements (Balance Sheet, Income Statement and Cash Flow Statement) with financial ratios and trends, Trade information (payments, delinquency amounts and depth (30 days past due, 90 days past due, etc.), together with past Max/Min/average credit amounts), Legal indicators (Suit, liens, judgment), Derogatory information (director previous association with bankruptcy, etc.), social and mass media information (e.g. positive, negative, and neutral scoring of company on social networks and web, trending data, etc.), and Business Linkage Info (headquarters, branch, subsidiary).

In at least one of the various embodiments, scores and other data from the TPI Engine 412 and the GCRM Engine 422 can flow to scoring generator 516. In at least one of the various embodiments, scoring generator 516 can be arranged to generate one or more scores based on the TPI likelihood rating score from the TPI Engine 412 and the general compliance risk rating score from the GCRM Engine 422.

In at least one of the various embodiments, the scoring information can be sent to a display interface 520 that can render a display of the information produced by the other components of the systems. In at least one of the various embodiments, a dashboard display 520 can be presented on a client computer accessed over network, such as client computers 102-105 or the like.

FIG. 5B shows a logical architecture and flow for artificial Intelligence (AI) for machine learning and processing and classifier building. AI machine learning classification can be based on any of a number of known machine learning algorithms, including classifiers such as the classifiers described herein (e.g., cluster, K-means cluster, decision tree, random forest decision tree, gradient boosted trees machine, propositional rule learner, linear regression, neural nets, synthetic minority over-sampling technique (SMOTE), support vector machines (SVM), etc.).

For example, in an embodiment, the system can be configured to employ a clustering algorithm on a training database to group companies identified as TPIs and unidentified companies to generate classes and classifiers for TPI identification. The classifier results can then be compared against databases of known TPI companies to confirm accuracy and refine the classifiers. In at least one of the various embodiments training databases can be compiled by mapping business entity data from a business entity databases to pre-identified TPI companies to create weights for factors in TPI identification, for example, firmographics, business entity analytical scoring, past financial statements (e.g. 5 year window), legal indicators and Business Linkage information.

In embodiments, different machine learning algorithms can be run on the same database and then the results confirmed by supervision to identify the best AI for different datasets, as described herein. For example, in training a classifier for a TPI engine's master matching table, it was found that where a given region or company is correlated with the company, in one embodiment, the TPI engine can employ a Random Forest algorithm, which is used for 70% of regions identified, where the remaining 30% of regions employ a Scorecard algorithm classifier because of data quality and data coverage.

In at least one embodiment, at block 501, the system AI is configured to identify likely TPI's by correlation with known TPIs. Even where a number of known TPIs is small or scarce, the TPI engine can employ a master matching table and AI machine learning engine to identify likely TPIs.

For example, where initially there are 69 known TPIs available from past compliance efforts in a large global third party portfolio, conventional risk analytics would be unable to use such a small number assess compliance risk. Accordingly, in an embodiment, the system can be configured with supervised machine learning employing a AI classifier, for example, a Balanced Random Forest, SMOTE, SVM, Neural Nets, etc.

For the illustrative example in Table 2, a Random Forest is employed to classify and capture the known TPIs. Table 2 illustrates an example where 9 groups were created and ranked by the predicted probability of TPIs from supervised machine learning; most of the known TPIs (71%) were found in Group 1. Accordingly, where known and unknown TPIs are classified by one or more TPI profiles matching Group 1, the system can classify previously unknown TPIs as predicted TPIs or inferred TPIs. Thus the system AI is configured to classify and identify known and unknown TPIs, which not only identifies likely TPIs, but also increases the pool of TPI's for further AI analysis.

TABLE 2

| Groups | Records | TPIs | % of Records | TPI Capture |
| --- | --- | --- | --- | --- |
| 1 | 231 | 49 | 1.0% | 71.0% |
| 2 | 229 | 10 | 1.0% | 14.5% |
| 3 | 237 | 3 | 1.0% | 4.3% |
| 4 | 251 | 4 | 1.1% | 5.8% |
| 5 | 238 | 0 | 1.0% | 0.0% |

TABLE 2-continued

| Groups | Records | TPIs | % of Records | TPI Capture |
| --- | --- | --- | --- | --- |
| 6 | 206 | 1 | 0.9% | 1.4% |
| 7 | 261 | 1 | 1.1% | 1.4% |
| 8 | 234 | 1 | 1.0% | 1.4% |
| 9 | 21,836 | 0 | 92.0% | 0.0% |
| Total | 23,723 | 69 | 100% | 100% |

For example, as shown in Table 3 with the addition of inferred TPIs, the system AI can employ supervised learning models, for example a Balanced Random Forest, SMOTE, SVM, Neural Nets, etc., to assign TPI Weight of Evidence (WOE) propensity scores to all third-party records. For the simplified illustrative example in Table 3, a scorecard model illustrates the assign TPI Weight of Evidence (WOE) propensity scores.

TABLE 3

| Parameter | Estimate | Standard Error | Wald ChiSq | Pr > ChiSq | Standardized Estimate |
| --- | --- | --- | --- | --- | --- |
| Intercept | −5.0354 | 0.1366 | 1358.1630 | <.0001 | |
| WOE_V | 0.5894 | 0.1176 | 25.0991 | <.0001 | 0.6423 |
| WOE_S | 0.5518 | 0.0841 | 43.0966 | <.0001 | 0.4319 |
| WOE_L | 0.5898 | 0.0509 | 134.2597 | <.0001 | 0.3716 |
| . . . | . . . | . . . | . . . | . . . | . . . |
| WOE_M | 0.5942 | 0.1235 | 23.1616 | <.0001 | 0.2510 |
| WOE_P | 0.2959 | 0.0707 | 17.5331 | <.0001 | 0.1491 |
| WOE_K | 0.2930 | 0.1114 | 6.9097 | 0.0086 | 0.0348 |

In an embodiment, for initial construction, to identify both reported and non-reported TPIs, based on domain knowledge, attributes can be removed and new attributes added for data values to populate and be weighted. A list of attributes from thousands of attributes (as described above with respect to illustrative attributes of Table 1) can be employed for unsupervised machine learning to segment a third-party portfolio of TPIs into homogenous clusters. For a simplified illustrative example, as shown in Table 4, an unsupervised machine learning clustering algorithm produces 9 clusters. Cluster 4 had the highest "Reported TPI" rate (33%), and captured most of Reported TPIs (77%). Because the new list of attributes for unsupervised learning was built for both reported and non-reported TPIs, all third parties in Cluster 4 are either Reported or Business Inferred (non-reported) TPIs, (after removing records where TPI exclusion rules apply).

TABLE 4

| Cluster ID | % of Records | TPI Rate | % of TPIs |
| --- | --- | --- | --- |
| 1 | 8% | 1% | 2% |
| 2 | 8% | 0% | 0% |
| 3 | 17% | 0% | 0% |
| 4 | 12% | 33% | 77% |
| 5 | 22% | 0% | 1% |
| 6 | 6% | 7% | 8% |
| 7 | 9% | 1% | 1% |
| 8 | 13% | 2% | 5% |
| 9 | 4% | 8% | 6% |

In an embodiment, the AI can be configured to include supervised learning models, using both reported and non-reported TPIs as a target, to generate unbiased TPI identification with WOE parameters that are not reliant on TPI self-identification or manual investigation. By way of simplified example, AI employing supervised learning, for example a Random Forest, generates classifications which inform grouping and WOE parameters for reported and implied TPI, as illustrated in the scorecard model shown in Table 5.

TABLE 5

| Parameter | Estimate | Standard Error | Wald Chi-Square | Pr > ChiSq | Standardized Estimate |
|---|---|---|---|---|---|
| Intercept | −2.0754 | 0.0627 | 1096.9037 | <.0001 | |
| WOE_V | 1.1936 | 0.0549 | 472.2963 | <.0001 | 1.2880 |
| WOE_S | 1.3424 | 0.0529 | 643.5562 | <.0001 | 1.0040 |
| WOE_L | 0.9475 | 0.0468 | 410.0729 | <.0001 | 0.5789 |
| ... | ... | ... | ... | ... | ... |
| WOE_A | 0.7291 | 0.0688 | 112.4597 | <.0001 | 0.3350 |
| WOE_P | 0.5630 | 0.0455 | 152.8571 | <.0001 | 0.3350 |
| WOE_M | 0.4229 | 0.0712 | 35.2955 | <.0001 | 0.2720 |
| WOE_K | 0.4682 | 0.0873 | 28.7429 | <.0001 | 0.0844 |
| WOE_I | 0.4047 | 0.1971 | 4.2152 | 0.0401 | 0.0709 |
| WOE_R | 0.3393 | 0.1382 | 6.0279 | 0.0141 | 0.0518 |

The system can be configured to use AI to determine which classifiers produce the better scoring. For example, as explained herein, in training classifiers for a GCRM engine, it was found, in one embodiment, that the GCRM engine can employ a Random Forest algorithm for 70% of regions identified, where the remaining 30% of regions can be split between SVM and Gradient Boosting classifier algorithms.

The system can also be configured for recursive iteration of the algorithm upon due diligence or other post facto validation of an inferred or likely TPI as a known TPI. Moreover, over time classifiers can be periodically reapplied and results reconfirmed to find the best classifiers for additional and changing data sets and windows. For example, as shown at block 503, subsequent compliance due diligence efforts, combined with the AI analytics results can generate additional confirmed TPIs or first identified as predicted or inferred TPIs. For example, at block 501 the system ingests a database including entities identified as true Non-TPIs, known TPIs, and unknown entities. At block 502, the system then identifies predicted TPIs as described herein. At block 503, entities can be verified or validated as TPIs or not. For example, there can be new, known TPIs provided from other data sources or from other due diligence, including via conventional approaches. The new TPIs enhance the recency and purity of the existing TPI database, for example, where inferred TPIs include impurities. The new confirmation of validated true non-TPIs, known TPIs and confirmed TPIs can then be used to refine and optimize the AI for more accurate predictions. Adaptive learning in next iterations make the analytics results more reliable and accurate, as well as able to reflect real-world changes and windows for TPI identification and weighting of parameters.

Generalized Operation

The operation of certain embodiments will now be described with respect to FIG. 6. In at least one of various embodiments, processes 600 described in conjunction with FIG. 6, respectively, can be implemented by and/or executed with dual processing, for example using a network computer 300 of FIGS. 3-5, configured to operate as a mainframe or in a big data processing platform for respective TPI and GCRM engines as described herein. However, embodiments are not so limited, and various combinations of network computers, client computers, virtual machines, or the like can be utilized. Further, in at least one of the various embodiments, the processes described in conjunction with FIG. 6 can be operative in system with logical architectures such as those described in conjunction with FIGS. 1-5B.

FIG. 6 illustrates an overview flowchart for process 600 for generating a TPI likelihood and risk rating in accordance with at least one of the various embodiments. At block 602, in at least one of the various embodiments, the system receives a request for a TPI likelihood rating and compliance risk for at least one company of interest. For example, a multinational supplier portfolio includes a supplier from Mexico, the ABC Company. For purposes of explanation, an example using a single company is given, however the system can be configured to perform batch processing of large portfolios to identify a large number of companies that are TPIs, which as described herein, thereby provides a system that objectively and independently identifies TPI likelihood and compliance risk. As noted herein, this previously could only be done manually and with voluntary self-reporting, thus constraining compliance efforts in both number of companies identified and validation.

At block 604, in at least one of the various embodiments, a TPI Engine receives at least the company name for the request. In at least one of the various embodiments, the system receives a company name and address, which goes to the TPI Engine. In at least one of the embodiments, the system may receive the company name and/or address system host's native language (e.g. English for a U.S. host) or in local language from another region or country (e.g., non-English). For example, the TPI Engine receives the request for analysis of the ABC company to generate a TPI score and compliance risk assessment rating for ABC Company. As described herein, the TPI Engine has own processing system in order to process data independently from the GCRM engine for, inter alia, parallel processing. In an embodiment, the TPI Engine can be configured to include one or more mainframe computer network servers; the TPI Engine mainframes can be configured to update less frequently than the GCRM engine and/or other massive data processor. Thus, the independent processors for the engines require less overall processing power, thus the dual processing structure can advantageously provide optimal system load without sacrificing overall speed or data processing on both paths. Moreover, a TPI engine mainframe can be configured to directly accept and process a greater variety of conventional formats for data without the need for additional data cleansing or other conversion, in contrast to big data processing computers (e.g. a HADOOP system for a GCRM engine or other TPI data processing).

A block 606 the TPI engine receives business entity data from a global business partner/3d party database(s) 320, a business entity information database(s) 318, and/or public data database(s) 316. For example, in an embodiment the TPI engine accesses or receives data from at least business entity database 318 from business entity analytics servers 118.

At block 608, in at least one of the various embodiments, the information for the identified business entity is correlated with the business information from at least one of the databases. For example, the ABC company can be identified in the business entity database, from which the TPI engine identifies that the ABC company is a new business partnership legal consulting firm with 6 employees; the ABC company is not involved in global business and all business is local to Mexico. The business name, street address and telephone number are all found in the business entity database(s) 318. The TPI engine also determines one partner of ABC company is associated with a business bankruptcy in last 7 years; this data can come from the business entity database 318 or from public information databases. The TPI engine can also receive business scoring and rating data from the business entity database 318. The business entity analytics server 112 analyzes business data to provide scores and ratings. For example, the business entity analytics server 112 may provide country risk ratings (e.g.: Mexico Country Risk Rating by the business entity analytics server is 3.75, which is relatively high).

At block 610, in at least one of the various embodiments, the TPI engine identifies factors for the company to determine the business entity is a TPI. For example, as noted above, the TPI engine also determined one partner of ABC company is associated with a business bankruptcy in last 7 years and that Mexico has a Country Risk Rating from the business entity analytics server of 3.75. These factors, together with information such as ABC is a new company with 6 employees, are examples of factors that can indicate a company is a TPI. As explained herein, such factors can number in the thousands.

At block 612, in at least one of the various embodiments, the TPI engine processing the business entity identification data, correlated business information, and the identification data using the TPI master matching table and processing module. In an embodiment, the master matching table includes one or more machine learning AI engine classifiers. In at least one embodiment, the system AI is configured to identify likely TPI's by correlation with known TPIs. As described herein, even where a number of known TPIs is small or scarce, the TPI engine can employ the master matching table and AI machine learning engine to identify likely TPIs. The classifier can be selected from a supervised machine learning engine, a non-supervised machine learning engine, or both. For example, the TPI engine's master matching table can include a Random Forest and SVM (Support Vector Machine), for example for a binary file table (for machine read only). For another example, the TPI engine's master matching table can include a Gradient Boosting classifier, for example, where the table is a complex text code. The TPI master matching tables can each contain a large complex number of rules as well as weights and WOE parameters for predictors. For example, where a given region or company is correlated with the company, in one embodiment, the TPI engine can employ a Random Forest algorithm, which is used for 70% of regions identified, where the remaining 30% of regions employ a Scorecard algorithm classifier because of data quality and data coverage. Thus, the system is configured to use AI to determine which classifiers fit to country/region data for the most accurate determination of likelihood that the company is a TPI. Based on data availability for this Mexico company ABC, random forest and unsupervised machine learning methods can be determined and selected in block 612.

At block 614, in at least one of the various embodiments, the TPI engine generates a TIP likelihood rating score from the TPI master matching table analysis. For example, based on TPI master match table of the TPI engine, which is the result of both supervised and unsupervised machine learning methods, the TPI Engine generates a TPI likelihood score of "5" on a 1-5 scale to ABC company, indicating there is a maximal likelihood that ABC company is a TPI.

At block 616, in at least one of the various embodiments, the TPI engine generates and stores the TPI likelihood rating and then passes the rating to a scoring module for generating a TPI risk compliance rating from the TPI likelihood rating score and the general compliance risk rating score at block 634.

At block 620, in at least one of the various embodiments, a GCRM Engine also receives at least the company name for the request received at block 602. For example, the GCRM Engine receives a request for analysis of the ABC company to generate a compliance risk assessment rating for ABC Company.

At block 622 the GCRM engine receives business entity data from a global business partner/3d party database(s) 320, a business entity information database(s) 318, and/or public data database(s) 316. For example, in an embodiment, the GCRM engine receives a large database of information for processing, for example, business analysis scores and indicators (e.g.: Country Risk info, country/market, "Perceived Corruption Index," company financial statements (5 years), trade/payment/delinquency information, and other risk indicator information from various data sources, such as social/mass media adverse coverage, previous compliance violations/warnings/sanctions/investigations instances and stage of investigations. As described herein, the GCRM Engine has an independent processing system, for example a massive big data processing architecture such as a HADOOP system or other mass data processor, in order to process data independently from the TPI engine for, inter alia, parallel processing with the TPI Engine. The GCRM Engine can be configured for committed big data processing such that the GCRM Engine, databases, and AI master matching table can take in the larger complex data set for optimal risk assessment.

At block 624, in at least one of the various embodiments, the information for the identified business entity is correlated with the business information from at least one of the databases. For example, global partner or third party database(s) in or for Mexico provide local or regional data on the ABC company. In an embodiment, the system can determine that in local language, the business name contains words "Construction," "Transportation," and "Consulting." In an embodiment, data from global business partners can be run though, for example, machine translation and name recognition classifiers for processing by the GCRM engine. The GCRM engine can also receive public data from public sources 116, such as Perceived Corruption Index by country, social media data, or judicial information.

At block 626, in at least one of the various embodiments, GCRM identifies one or more risk factors for the identified business entity. For example, the GCRM can identify that Mexico has index level at 30 on the Perceived Corruption Index, ranked 123 out of 176 countries/markets (relatively high end). The GCRM may also identify certain industries, such as construction, as more subject to compliance risk. The lack of public derogatory information is found about ABC company on social media can also be a factor that lowers risk, and at the same time, indictment of kickbacks charge on one of ABC's partners and 2 write-offs in ABC's payment accounts in last 5 years increase ABC's risk score.

At block 628, in at least one of the various embodiments, the GCRM engine processes the business entity identification data, correlated business information, and/or the identification data using the master matching table and processing module. In an embodiment, the master matching table includes one or more machine learning AI engine classifiers. The classifier can in be selected from a supervised machine learning engine, an unsupervised machine learning engine, or both. For example, the GCRM engine's master matching table can include a Random Forest and SVM (Support Vector Machine), for example for binary file table (for machine read only). For another example, the GCRM engine's master matching table can include a Gradient Boosting classifier, for example, where the table is a complex text code. The GCRM master matching tables can each contain a large complex number of rules as well as weights for predictors. In one embodiment, the GCRM engine can employ a Random Forest algorithm, which is used for 70% of regions identified, where the remaining 30% of regions are split between SVM and Gradient Boosting classifier algorithms. In at least one of the various embodiments, countries are grouped into regions, and each region is run on different classifiers as described above. Thus, the system is configured to use AI to determine which classifiers fit to country/region data for the most accurate determination of the compliance risk.

At block 628, in at least one of the various embodiments, the GCRM engine generates a GCRM rating score from the master matching table analysis. For example, based on GCRM Master Match Table of the GCRM engine, which is the result of both supervised and unsupervised machine learning methods, the GCRM Engine generates a compliance risk rating of "E" on a A-E scale for ABC company, indicating there is a maximal likelihood that ABC company is at high risk for corruption or bribery.

At block 630, in at least one of the various embodiments, the GCRM engine stores the GCRM likelihood rating and then passes the rating to a scoring module for generating a TPI risk compliance rating from the TPI likelihood rating score and the general compliance risk rating score at block 634.

At block 634, the system then takes TPI likelihood rating score and the general compliance risk rating score and generates a final TPI likelihood and risk rating. For example, ABC company is given a TPI likelihood and risk rating of "5E", meaning ABC is very likely a TPI and is also at very high risk of being a compliance risk. As ABC does not self-report as a TPI or has not otherwise been identified as such, and as ABC has been found via data AI processing to be at high risk of corruption, the system provides a tool for identifying and mitigating ABAC that could not previously be done, as prior art systems relied on absent self-reporting of TPIs.

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel, for example as described herein. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments.

In at least one of the various embodiments the system can be configured to send data to client device. Such user interfaces can have more or fewer user interface elements which can be arranged in various ways. In some embodiments, user interfaces can be generated using web pages, mobile applications, emails, PDF documents, text messages, or can include processes and/or API's for generating user interfaces. In an embodiment, the system can be configured to provide a client application with one-click batch processing to batch process a list of business entities to generate a TPI identification risk compliance ratings for each of the listed business entities.

The invention claimed is:

1. A system comprising:
   a network computer system, including:
   a transceiver for communicating over the network;
   an operative connection to one or more databases comprising business information data from at least one of a business information database, public information sources, and a global partner database;
   a Third Party Intermediary Identification (TPI) Engine comprising
   a processor memory;
   a processor module including a TPI master matching table, wherein the TPI master matching table includes a machine learning engine;
   a processor that is configured to generate a TPI likelihood rating score for a business entity using the TPI master matching table and the business information data from at least one of the databases; and
   a General Compliance Risk Management (GCRM) Engine comprising
   a processor memory;
   a processor module including a GCRM master matching table, wherein the GCRM master matching table includes a machine learning engine; and
   a processor that is configured to generate a general compliance risk rating score for a company using the GCRM master matching table and business information data from at least one of the databases;
   wherein the system is configured to generate a TPI identification and risk compliance rating from the TPI likelihood rating score and the general compliance risk rating score for the business entity;
   wherein the system is configured to run the TPI Engine and the GCRM Engine in parallel; and
   wherein the system comprises an application interface configured to provide one-click batch processing to process a list of the business entities to generate a plurality of the TPI identification risk compliance ratings for each of the listed business entities.

2. The system of claim 1, wherein the TPI Engine processor is configured to:
   receive, for a business entity, business identification data including a company name;
   receive the business information data from at least one of the business information database, public information sources, and the global partner database;

correlate the business entity with the business information data from at least one of the databases; and identify one or more TPI identification factors for the business entity;

process the business entity identification data, correlated business information, and the one or more TPI identification factors using the master matching table; and generate the TPI likelihood rating score.

3. The system of claim 1, wherein the GCRM Engine processor is configured to:

receive business entity identification data from the global partner database;

correlate the identified business entity with the business information from at least one of the business information database, public information sources, and the global partner database;

identify one or more risk factors for the identified business entity;

process the business entity identification data, the correlated business information, and the risk factor data using the master matching table; and generate the general compliance risk rating score.

4. The system of claim 1 wherein the parallel processing is run using a Hadoop Distributed File System for the GCRM Engine and a mainframe computer for the Third Party Intermediary Identification Engine.

5. The system of claim 1 wherein the data received from the business information database, public information sources, and the global partner database includes one or more of: partner data, firmographics, financial statements, trade information; business indicators or scores, legal indicators, and business linkage information.

6. The system of claim 1, wherein the machine learning engine for the TPI Engine, the GCRM Engine, or both include a classifier selected from the group of: cluster, K-means cluster, decision tree, random forest decision tree, gradient boosted trees machine, propositional rule learner, linear regression, neural nets, synthetic minority over-sampling technique (SMOTE), and support vector machines (SVM).

7. The system of claim 2 wherein the TPI Engine machine learning engine includes a classifier configured to identify the one or more TPI identification factors for the business entity.

8. The system of claim 3 wherein the GCRM Engine machine learning engine includes a classifier configured to identify the one or more risk factors for the business entity.

9. A method comprising:

receiving a business entity identification data including a company name into a network computer system comprising a Third Party Intermediary Identification (TPI) Engine and a General Compliance Risk Management (GCRM) Engine, each of the TPI Engine and GCRM Engine including a master matching table including a machine learning engine;

receiving, in the TPI Engine, business entity data from one or more databases comprising data from at least one of a business information database, public information sources, and global partner database;

generating, by the TPI Engine, a TPI likelihood rating score for the business entity using the TPI master matching table and the business information data from at least one of the;

receiving, in the GCRM Engine, business entity data from one or more databases comprising data from at least one of the business information database, the public information sources, and the global partner database;

generating, by the GCRM Engine, a general compliance risk rating score for a company using the GCRM master matching table and the business information data from at least one of the databases; and generating a TPI identification and risk compliance rating from the TPI likelihood rating score and the general compliance risk rating score;

wherein the TPI Engine and the GCRM Engine in are run in parallel; and providing an application programming interface for one-click batch processing to process a list of the business entities to generate a plurality of the TPI identification and risk compliance ratings for each of the listed business entities.

10. The method of claim 9, wherein the TPI Engine:

receives, for the business entity, the business identification data including the company name;

receives the business information data from at least one of the business information database, the public information sources, and the global partner database;

correlates the business entity with the business information data from at least one of the databases; and identifies one or more TPI identification factors for the business entity; and processes the business entity identification data, the correlated business information, and the one or more TPI identification factors using the master matching table; and generates the TPI likelihood rating score.

11. The method of claim 9, wherein the GCRM Engine:

receives the business entity identification data from the global partner database;

correlates the identified business entity with the business information from at least one of the business information database, the public information sources, and the global partner database;

identifies one or more risk factors for the identified business entity;

processes the business entity identification data, the correlated business information, and the risk factor data using the master matching table; and generates the general compliance risk rating score.

12. The method of claim 9 wherein the method comprises:

running the parallel processing using a Hadoop Distributed File System for the GCRM Engine and a mainframe computer for the Third Party Intermediary Identification Engine.

13. The method of claim 9 wherein the data received from the business information database, the public information sources, and the global partner database includes one or more of: partner data, firmographics, financial statements, trade information; business indicators or scores, legal indicators, or business linkage information.

14. The method of claim 10 wherein the method comprises:

identifying the one or more TPI identification factors for the business entity with the TPI Engine's machine learning engine.

15. The method of claim 11 wherein method comprises:

identifying the one or more risk factors for the business entity with the GCRM Engine machine learning engine.

16. The method of claim 9, wherein the machine learning engine for the TPI Engine, the GCRM Engine, or both include a classifier selected from the group of: cluster, K-means cluster, decision tree, random forest decision tree, gradient boosted trees machine, propositional rule learner, linear regression, neural nets, synthetic minority over-sampling technique (SMOTE), and support vector machines (SVM).

17. The method of claim 9, further comprising:
receiving verification data verifying a business entity is a TPI; and
updating the master matching table including the machine learning engine of at least one of the TPI Engine and the GCRM Engine.

\* \* \* \* \*